M. R. HUTCHISON & C. W. NORTON.
STORAGE BATTERY.
APPLICATION FILED MAY 23, 1914.

1,283,779.

Patented Nov. 5, 1918.
5 SHEETS—SHEET 1.

Witnesses:
Frederick Bachmann
William A. Hardy

Inventors:
Charles W. Norton
and
Miller Reese Hutchison
by Dyer & Holden
their Att'ys.

M. R. HUTCHISON & C. W. NORTON.
STORAGE BATTERY.
APPLICATION FILED MAY 23, 1914.

1,283,779.

Patented Nov. 5, 1918.
5 SHEETS—SHEET 2.

Witnesses:
Frederick Bachmann
William A. Hardy

Inventors:
Charles W. Norton
and Miles Reese Hutchison
by Dyer & Holden
their Att'ys.

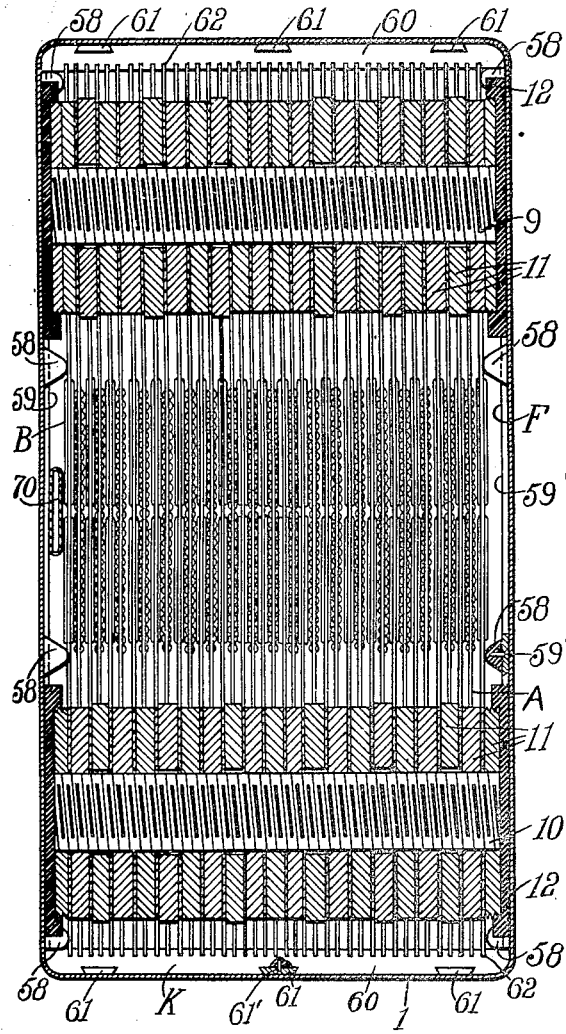
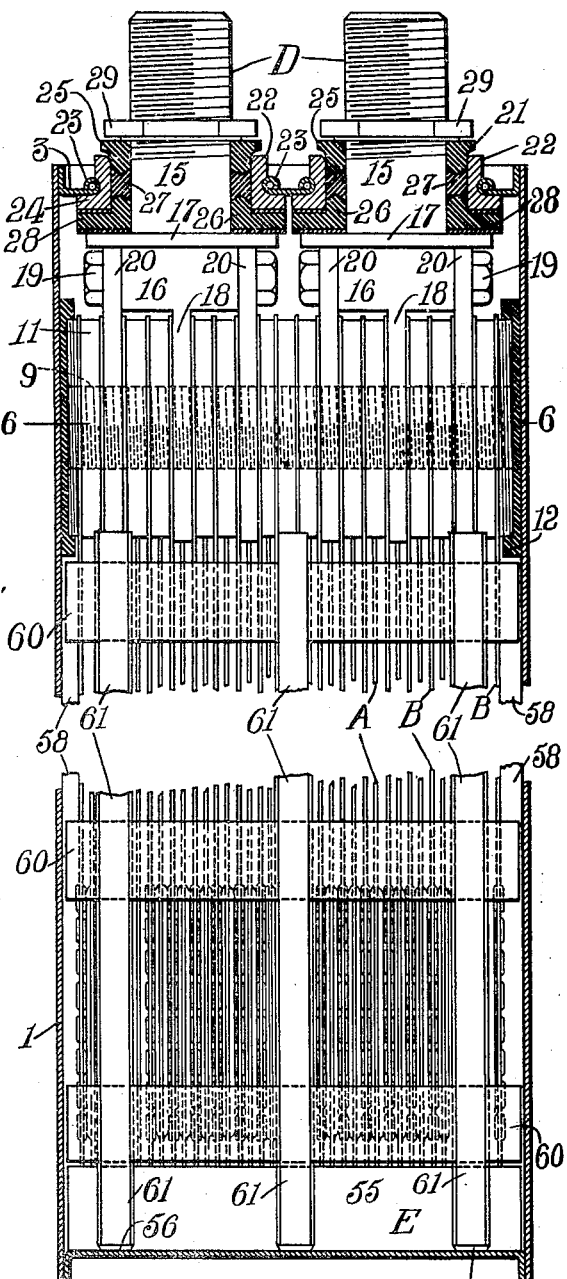

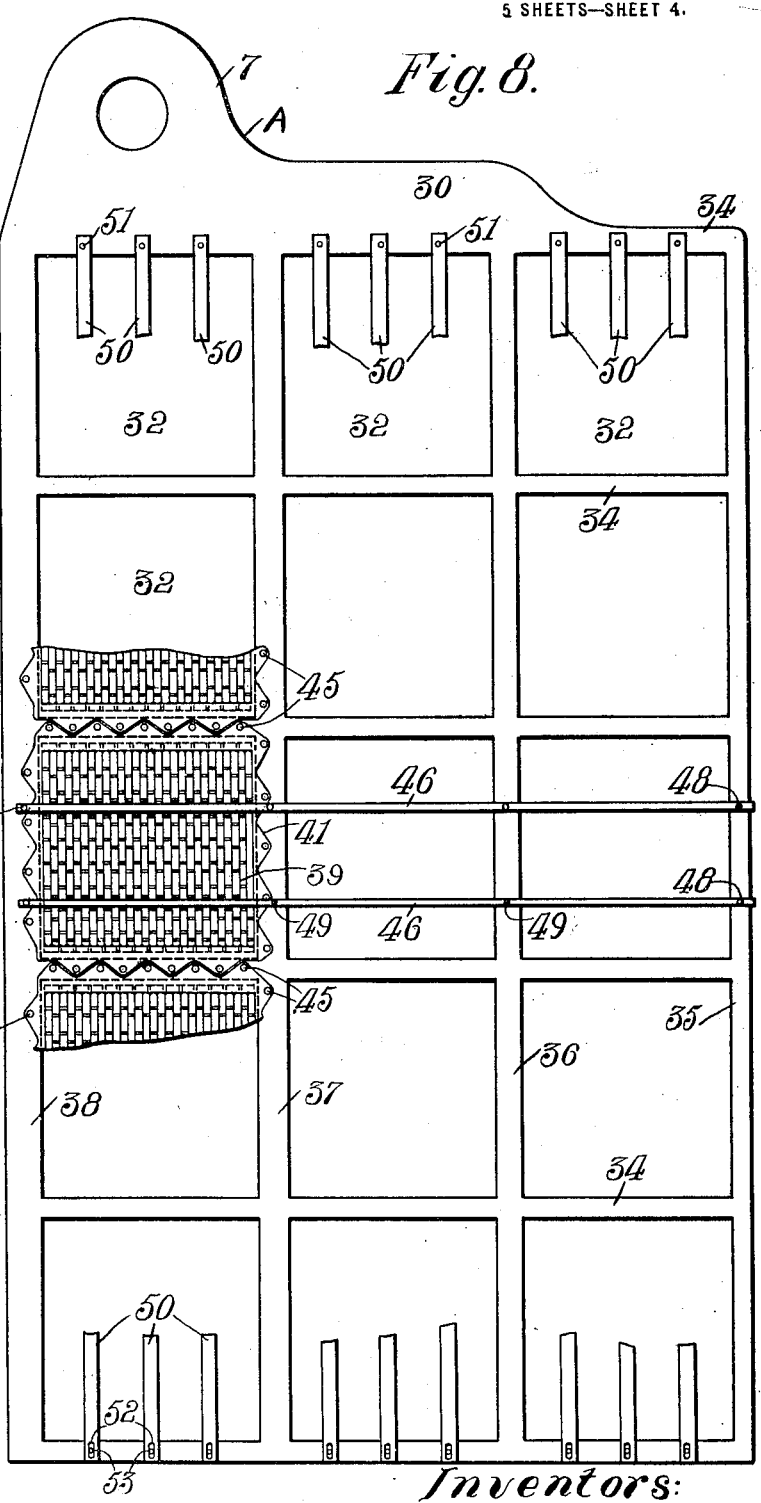

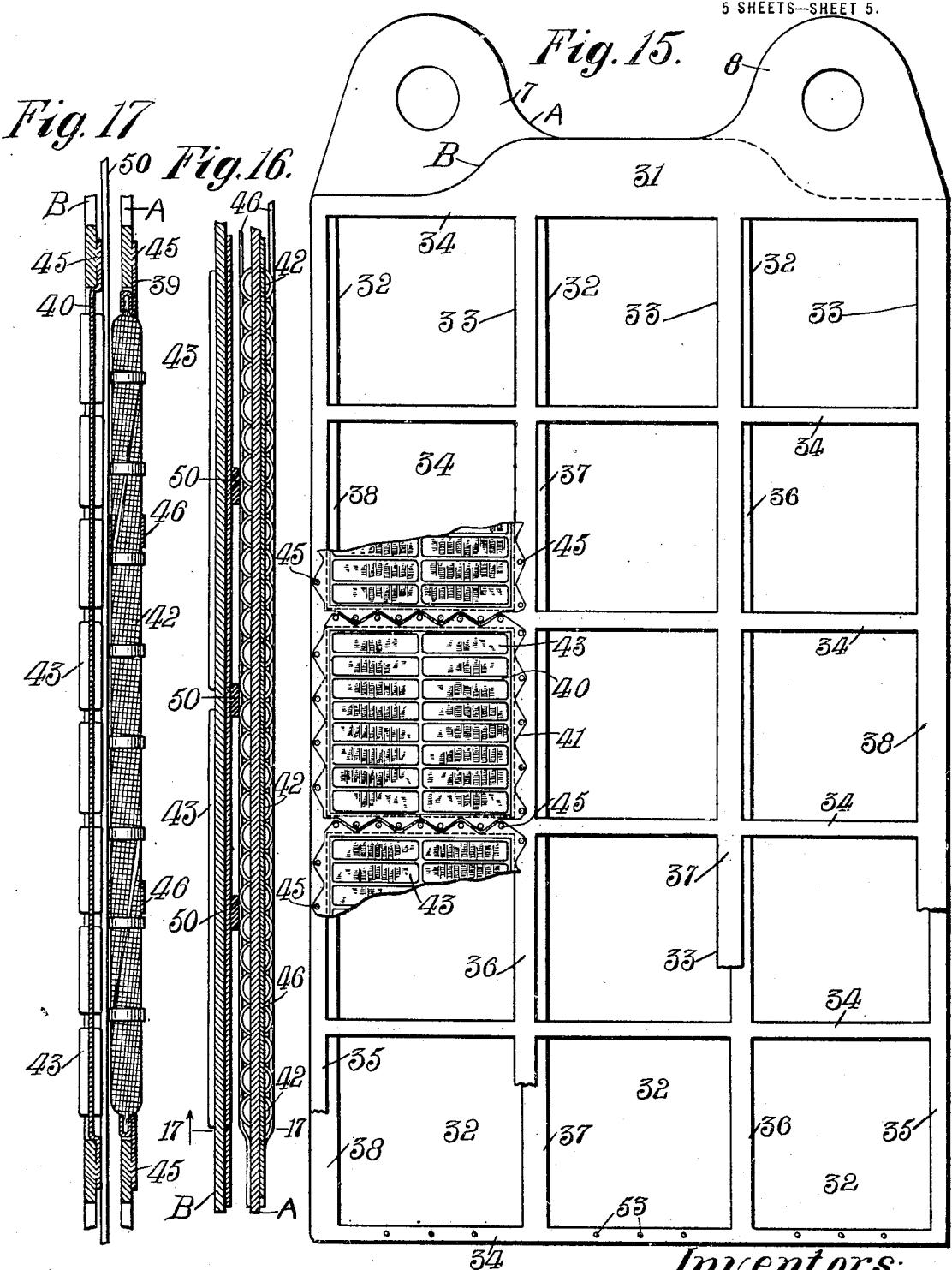

UNITED STATES PATENT OFFICE.

MILLER REESE HUTCHISON AND CHARLES W. NORTON, OF WEST ORANGE, NEW JERSEY, ASSIGNORS TO EDISON STORAGE BATTERY COMPANY, OF WEST ORANGE, NEW JERSEY, A CORPORATION OF NEW JERSEY.

STORAGE BATTERY.

1,283,779.   Specification of Letters Patent.   Patented Nov. 5, 1918.

Application filed May 25, 1914. Serial No. 840,462.

*To all whom it may concern:*

Be it known that we, MILLER REESE HUTCHISON, a citizen of the United States, and a resident of Llewellyn Park, West Orange, Essex county, New Jersey, and CHARLES W. NORTON, a citizen of the United States, and a resident of West Orange, Essex county, New Jersey, have invented certain new and useful Improvements in Storage Batteries, of which the following is a description.

Our invention relates to secondary or storage batteries and more particularly to storage batteries of the Edison type wherein an alkaline electrolyte is employed and in which the positive elements contain flake nickel and nickel hydroxid and the negative elements contain electrolytically active finely divided iron or oxid of iron. It is to be understood, however, that the features comprising our invention are applicable to storage batteries of other types.

The principal object of our invention is to provide an improved battery structure of simple arrangement and construction especially designed for storage batteries having a great capacity and a high rate of discharge, as for example batteries used on submarine vessels, whereby batteries of various shapes, sizes and capacities may be quickly and easily assembled and whereby the operation of such batteries will be improved and their efficiency and durability increased.

Another feature of our invention consists in the provision of improved means whereby adjacent cells may be readily connected without moving the cells irrespective of slight inaccuracies in the spacing of the cells and slight differences in the levels of the supports therefor.

Other objects and features of our invention reside in the details of construction and combinations of elements hereinafter more specifically described and claimed.

For a clearer understanding of our invention, attention is hereby directed to the accompanying drawings forming part of this specification and in which:—

Fig. 5 is an enlarged view in side elevation, partly broken away, of the cell shown in Fig. 1, one side of the container being removed and parts being shown in section;

Fig. 6 is a transverse sectional view on line 6—6 of Fig. 5, parts being shown in full;

Fig. 8 is an enlarged view in elevation, partly broken away, of one of the positive elements or plates and the parts carried thereby;

Figs. 9, 10, 11 and 12 are enlarged detailed views showing the arrangement of the vertical strips for separating and insulating the positive from the negative elements or plates and the manner in which these strips are supported;

Figs. 13 and 14 are enlarged fragmentary transverse sectional views taken respectively at opposite sides of one of the positive elements or plates, showing the transversely extending strips for holding the tubular pockets in place and the manner in which these strips are secured to the plate;

Fig. 15 is an enlarged view in front elevation, partly broken away, of a pair of adjacent negative and positive elements in the same relative position they occupy when assembled in the cell;

Fig. 16 is an enlarged fragmentary sectional view taken approximately on line 16—16 of Fig. 1 through a pair of adjacent positive and negative plates; and Fig. 17 is a sectional view taken approximately on line 17—17 of Fig. 16, looking in the direction indicated by the arrow.

In the drawings, the same reference characters are used to designate corresponding parts in all the views.

Figure 2:
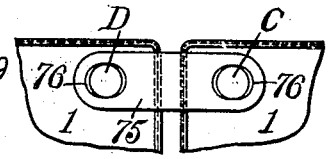
Fig. 2 is a fragmentary plan view of a pair of cells showing the improved means for connecting the same.

The battery can or container 1 is preferably rectangular in form and made of thin nickel-plated sheet steel with the bottom 2 and top 3 welded to the side walls, and the latter are each provided with transversely extending corrugations 4, whereby a light air-tight container of great strength and rigidity is obtained.

Reference characters A and B respectively represent the positive and negative elements or plates which are alternately arranged side by side within the container 1, the number of negative elements preferably exceeding the number of positive elements by one, whereby both of the outside elements or plates will be negative. The positive elements are each provided at one side with an apertured projection 7 and the negative elements are each provided at the opposite side with an apertured projection 8. All the positive elements are mounted on a horizontal screw-threaded rod 9 by means of the projections 7, and all the negative elements are mounted on another horizontal screw-threaded rod 10 by means of the projections 8. The plates are suitably spaced from each other on the rods 9 and 10 as by means of large metallic nuts or spacing rings 11 threaded on the rods. The outermost rings 11 are exteriorly screw-threaded and are engaged by interiorly screw-threaded hard rubber caps 12, which serve to insulate rods 9 and 10 and the rings or nuts 11 from the front and rear walls of the container 1 and assist in maintaining the parts assembled on the rods, as clearly shown in Figs. 5 and 6.

A plurality of terminals or poles are preferably provided for each of the sets of negative and positive elements or plates, and in the construction illustrated there are two terminals C for the positive plates A and two terminals D for the negative plates B. Each of the poles or terminals comprises a cylindrical portion 15 passing through a fluid-tight stuffing box in the cover 3 and having a screw-threaded outer end. The inner end of each of the poles is preferably formed with a substantially rectangular head 16 and between the latter and the cylindrical portion 15 each pole is provided with a flange 17. The head 16 has a downwardly extending projection 18, preferably formed integrally therewith substantially midway of its length, and also has secured to its ends, as by means of bolts 19, vertical plates 20. The projections 18 and plates 20 of the respective pairs of terminals C and D are provided with alined apertures through which the rods 9 and 10 loosely pass and are each disposed between two adjacent elements or plates A or B in place of a spacing ring 11. As shown in Figs. 5 and 6, the members 18 and 20 of poles C are so disposed that the set of positive plates A is, in effect, divided into two equal groups, the plates of which are symmetrically positioned with respect to the members 18 and 20 of the respective terminals. The members 18 and 20 of the poles D are similarly disposed on rod 10 so that the set of negative plates B is also, in effect, divided into two equal groups, one for each pole D.

By the construction just described, a large pole section is provided for each of the sets of negative and positive plates or elements, and contacting surfaces, the combined area of which is great, are presented to the plates or elements. This is especially advantageous in batteries of great capacity and having a high rate of discharge, as the internal resistance of such batteries is thereby greatly reduced, with a consequent decrease in the loss of energy during charging and discharging. Moreover, the reduction of the internal resistance results in the generation of less heat within the batteries.

Figure 1:
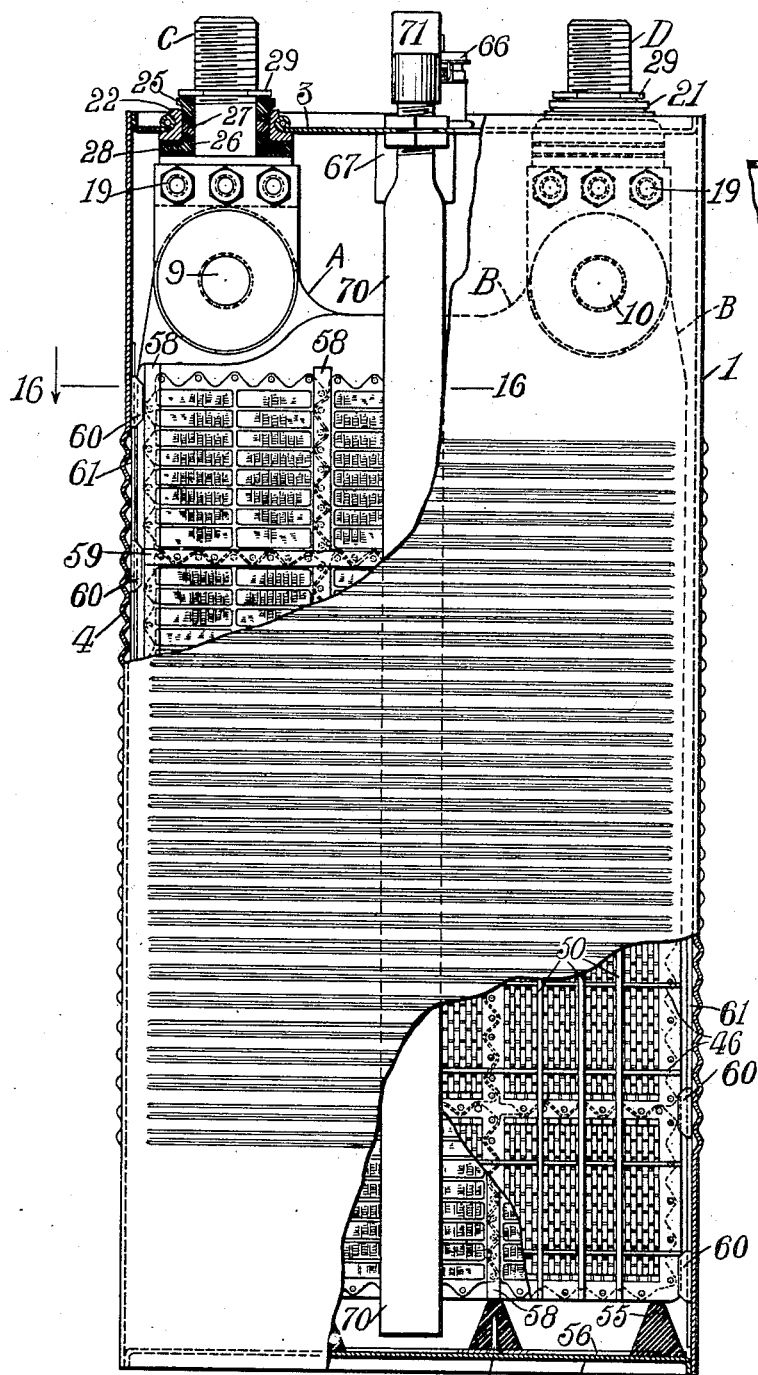
Figure 1 is a view in front elevation of a storage battery cell in accordance with our invention, parts thereof being broken away and parts being shown in section.
Figure 3:
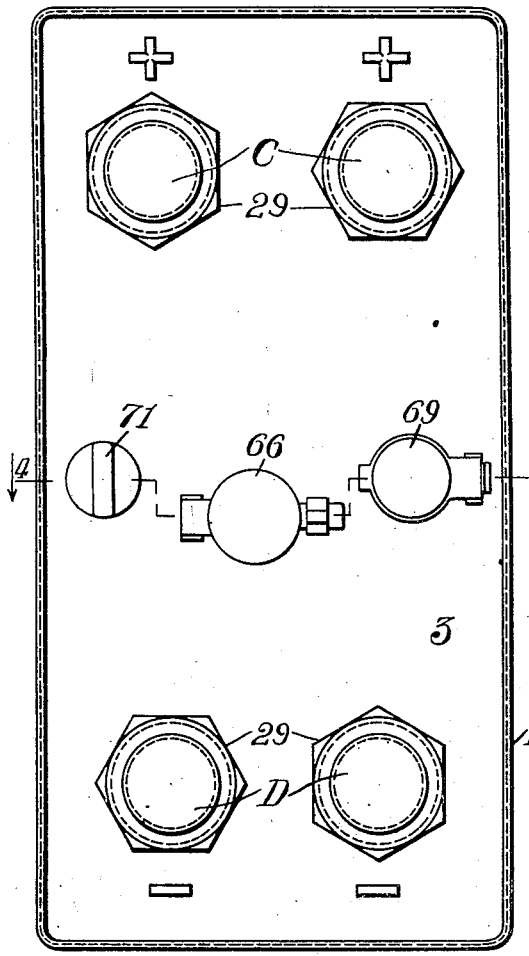
Fig. 3 is an enlarged plan view of the cell shown in Fig. 1.
Figure 4:
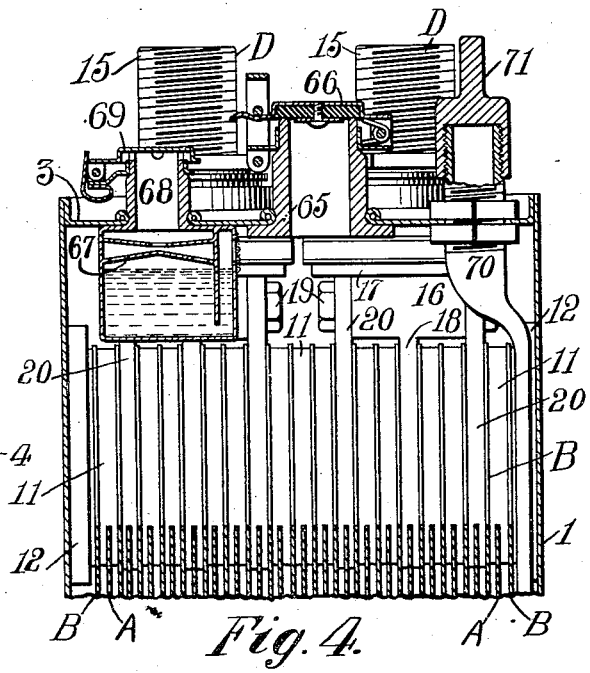
Fig. 4 is a sectional view taken approximately on the broken line 4—4 of Fig. 3, the lower part of the cell being omitted.

Reference character 21 represents the stuffing boxes secured in cover 3 and through which the poles extend. Each of the stuffing boxes comprises a neck or sleeve 22 secured in an opening in the top or cover 3, preferably by forming the cover with a bead 23 about such opening, which bead engages a groove or recess in the neck 22, whereby a very tight joint is secured. The neck 22 is provided with a flange 24 engaging the under side of the cover 3. Surrounding the cylindrical portion of the pole, where it passes through the neck or sleeve 22, is a pair of hard rubber sleeves or washers 25 and 26, between which is disposed an elastic ring 27, preferably of soft rubber. The inner end of sleeve 26 is provided with a flange 28, the upper surface of which engages the flange 24 and the lower surface of which engages the flange 17 of the terminal. A nut 29 is threaded on the outer end of each of the poles and by screwing down this nut the flanges 17 and 28 are brought into firm contact and at the same time the hard rubber sleeves or washers 25 and 26 are forced toward each other and the soft rubber ring 27 is thereby compressed and expanded laterally to form a fluid tight joint. The ends of sleeves 25 and 26 which engage the ring 27 are preferably beveled as shown in Figs. 1 and 5, whereby but a slight movement of these sleeves toward each other is required in order to expand ring 27 sufficiently to obtain a tight joint between the pole and the neck 22.

Under some circumstances, as for example in submarine vessels, where space is of great importance, the size and shape of the cells required for different installations vary greatly, depending largely on the space available for a set of batteries. In storage batteries, especially those of the Edison type, the size and shape of the battery can or container are determined by the number, size and shape of the negative and positive plates or elements therein. We have accordingly designed a construction enabling battery plates or elements of various sizes and shapes to be assembled with much greater ease and despatch and in a much more economical manner than if assembled in the ordinary manner.

This construction is clearly shown in Figs. 8 and 15, and in general consists of battery elements comprising main grids having attached thereto sub-grids carrying the pocket and tubes containing the active material. In these figures, reference character 30 represents the main grid of one of the positive elements A, and 31 the main grid of one of the negative elements B, these main grids being respectively provided, as by stamping, with openings 32 and 33, preferably square and of equal size. As shown, each main grid has twelve of these openings arranged in three vertical rows of four each, whereby the main grids are formed with the horizontal strips 34 and vertical strips or "risers" 35, 36, 37 and 38 adjacent the openings. The number and arrangement of the openings in the main grids may be varied in accordance with the size and shape of the battery elements and the size, shape and capacity of the cell required, but are preferably always of the same size and shape. Reference characters 39 and 40 respectively represent the sub-grids for the positive and negative elements A and B. The sub-grids 39 and 40 are preferably square and of equal size, being slightly larger than the openings 32 and 33 of the main grids, and the edges thereof are preferably serrated, as shown at 41, for a purpose which will presently appear. Tubes 42 containing flake nickel and nickel hydroxid are suitably secured at their ends to the sub-grids 39, and flat pockets 43 containing iron or iron oxid are suitably secured to the sub-grids 40, preferably in two rows. The tubes 42 are preferably only one-eighth or three-sixteenths of an inch in diameter instead of one-quarter of an inch as is usual. By using tubes of such small diameter, the electrolyte can more readily and intimately contact with all the finely divided material therein. Moreover, current flowing to or from the inner layers of the active material in each tube does not have to pass through thick outer layers of the material, and, as this material offers more or less resistance, the efficiency of the entire cell will be materially increased. The sub-grids 39 and 40 are respectively secured to main grids 30 and 31 over the openings 32 and 33 therein, preferably by welding the serrations or teeth of the serrated edges 41 of the sub-grids to the horizontal strips 34 and the vertical strips or "risers" 35, 36, 37 and 38 of the main grids, as shown at 45. The provision of the serrated edges 41 enables the adjacent edge portions of two sub-grids to be interfitted or intermeshed and welded to one of the strips 34, 35, 36, 37 or 38 on a substantially straight line, whereby it will not be necessary, in order to properly secure the sub-grids to the main grids, to make certain of these strips as wide as would be the case if the sub-grids had straight edges. Moreover, the interfitting serrated edge portions of the sub-grids act to reinforce the strips of the main grid to which they are secured and prevent buckling and warping thereof. Furthermore, after one of the sub-grids has been secured to a main grid, the serrated edge portions thereof are of assistance in properly positioning the remaining sub-grids to be secured to the main grid. The term "interfitting" used in this specification and the appended claims to describe the relative disposition or arrangement of the edge portions of adjacent sub-grids is not intended to be limited in meaning to a close or exact interfitting of such edge portions.

The sub-grids 39 are preferably secured to the main grids 30 with the tubes 42 vertically disposed while the sub-grids 40 are secured to main grids 31 with the pockets 43 in horizontal position. The small one-eighth or three-sixteenth inch tubes 42 are quite easily bent. In order to prevent displacement or bending of these tubes and the contacting of adjacent negative elements or plates, we provide each of the positive elements with means similar to that disclosed and claimed in an application of Miller Reese Hutchison, Serial No. 815,946, filed February 2, 1914, entitled Storage batteries. This means preferably comprises a plurality of horizontally arranged continuous strips or bands 46 bent around one edge of the main grid 30 and having a section disposed on either side of the latter and in contact with the tubes 42. The ends of each strip 46 are preferably welded at 47 to the "riser" 38 and the portion thereof bent around one edge of the main grid is welded at 48 to the strip or "riser" 35. Preferably, each strip 46 is also welded as shown at 49 to the "risers" 36 and 37. Two strips 46 are preferably employed for each horizontal row of sub-grids 39. In order to separate and insulate the positive and negative plates from each other, we preferably employ a plurality of vertical hard rubber strips 50, between each pair of adjacent plates A and B. By reason of the horizontal disposition of the pockets 43 in the main grids 31 and the use of the horizontal strips 46 secured to the main grids 30, it is necessary to employ but comparatively few of the strips 50 in order to maintain the elements of the cell properly insulated and spaced from each other. The strips 50 coöperate with the bands 46 to assist the latter in preventing the tubes 42 from bending and contacting with the negative elements or plates. In the construction shown in the drawings, three of the strips 50 are employed between each pair of adjacent vertical rows of sub-grids 39 and 40 and are preferably so arranged that two of the strips respectively engage the two rows of pockets 43 approximately at their middle portions, while the third strip engages the adjacent end portions of the pockets of these two rows, as clearly shown in Figs. 16 and 17. The strips 50, as shown in Figs. 8 and 12, are supported from the positive elements A by means of hard rubber pins 51 which extend through and are secured to the upper end portions of main grids 30, two of these strips being respectively secured to the projecting end portions of each pin 51 and accordingly disposed on opposite sides of the respective main grid 30. The lower ends of each pair of strips secured to a pin 51 are provided with vertical slots 53 which are engaged by the projecting end portions of a hard rubber pin 52 passing through and secured to the lower horizontal strip 34 of the respective main grid 30. The ends of each pin 52 respectively engage the adjacent negative elements B and assist in maintaining the latter and elements A properly spaced. The pin and slot connections 52 and 53 permit relative movement of strips 50 and main grids 30 to thereby provide for relative expansion and contraction of the same under changes in temperature during the charging or discharging of the cell.

In the course of our experiments, it developed that when the horizontal strips and vertical strips or "risers" of the main grids adjacent the openings 32 and 33 therein were as light and of as small cross sectional area as was consistent with the strength required and no wider than necessary to permit the proper attachment of the sub-grids 39 and 40 thereto, a slight loss of energy occurred during charging and discharging of the cell, due to the fact that the main grids of the elements A and B did not have sufficient conductivity or current-carrying capacity toward the pole sides thereof. We have accordingly rendered the main grids 30 and 31 of gradually increasing conductivity toward the pole sides thereof, preferably by making each vertical strip or "riser," from 35 to 38, wider than the one preceding, the outer strip 35 being substantially no wider than is necessary for the attachment of sub-grids 39 or 40 thereto.

Figure 7:
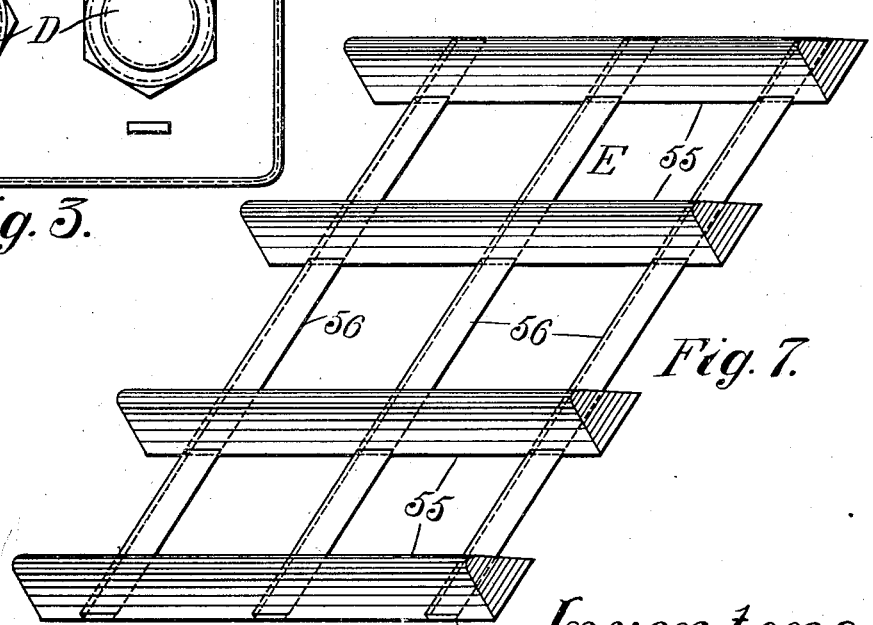
Fig. 7 is an enlarged view in perspective of the support or "stool" for insulating the assembled battery elements from the bottom of the container.

Plates A and B are supported and insulated from the bottom of the can or container at their lower edges by a frame or "stool" E. As clearly shown in Figs. 1 and 7, this "stool" comprises a plurality of parallel spaced bars 55 of hard rubber, which extend transversely of plates A and B and are suitably held together in spaced relation as by a plurality of parallel steel strips 56 disposed at right angles to the bars 55 and keyed thereto or dovetailed thereinto, as indicated at 57, so as to be substantially flush with the lower surfaces thereof. Bars 55 are preferably substantially triangular in cross section and are slightly rounded or flattened at their tops which engage with the lower edges of plates A and B. The bars 55 are suitably held against movement longitudinally of strips 56 as by means of pins 56'.

The plates or elements A and B are spaced and insulated from the front and rear walls of the container by frames F, each of which is disposed between one of the outside plates or battery elements B and the adjacent wall of the container, and each of which preferably consists of a plurality of parallel spaced vertical members 58 of hard rubber, secured together in spaced relation by a plurality of parallel horizontal steel strips 59. Members 58 are preferably triangular in cross section and slightly rounded at the top where they contact elements B, and the strips 59 are preferably dovetailed into members 58 so as to be flush with the bottoms thereof. Suitable means, such as pins 59', may be employed to prevent movement of members 58 longitudinally of the strips 59.

In the present construction, the positive and negative plates A and B are preferably so arranged that the edges thereof at each side of the cell are in the same plane, as clearly shown in Fig. 6. While with this arrangement the respective pairs of adjacent vertical rows of positive and negative sub-grids 39 and 40 will not exactly register, the efficiency of the cell will not be greatly impaired thereby.

The plates A and B are spaced and insulated from the side walls of the container by a pair of frames or "ladders" K, each of which preferably consists of a plurality of parallel spaced horizontal bars or members 60 of hard rubber, secured together in spaced relation by a plurality of parallel vertical steel strips 61. In cross section bars 60 preferably have the shape of truncated pyramids and the bottoms thereof engage with the side walls of the container. Strips 61 are preferably dovetailed into bars 60 so that they are substantially flush with the bottoms thereof, as shown in Fig. 6. The tops of bars 60 are each provided with a plurality of parallel vertical recesses or slits 62 of equal depth and in which the edges of the plates or elements A and B are respectively engaged to thereby assist in maintaining the plates or elements in proper spaced relation. Bars 60 may be held against movement longitudinally of strips 61 by any suitable means, such as pins 61'.

The container 1 is provided with the usual filling opening, preferably in the form of a tubular neck 65, suitably secured in the top 3 and provided with a cap or cover 66 which is normally maintained in closed position.

The cell is preferably provided with a safety device indicated generally at 67 which is suitably secured to the top 3 of the container and which is preferably of a construction similar to that disclosed and claimed in Patent No. 1,130,977 granted to Miller Reese Hutchison March 9, 1915, filed March 28, 1914, and entitled Safety devices. The safety device comprises a liquid seal through which all gases escaping from the cell are caused to pass, and has a tube or neck 68 extending above the container, which neck is provided with a lid or cover 69, normally held closed by spring pressure. The neck 68 is provided with suitable openings to permit the escape of gases from the cell.

Reference character 70 represents a tubular member or drain tube secured to and extending through the top 3 of the container, the upper end of this member being normally closed by a cap 71, and the lower end thereof terminating adjacent the bottom of the cell. The major portion of the tubular member 70 within the container is flattened in order that it may be readily disposed in the small space between one of the outside plates or elements B and the adjacent wall of the container, as shown in Fig. 6. When cap 71 is removed, the electrolyte may be readily removed from the container without inverting or tilting the latter, either by applying suction to the upper end of the tubular member or pressure to the surface of the electrolyte through the neck 68 of the safety device 67. The construction just described is similar to that disclosed and claimed in Patent No. 1,198,449, granted to Miller Reese Hutchison September 19, 1916, and entitled Storage batteries.

It frequently happens that the upper ends of adjacent cells of a battery are not quite accurately spaced as the supports for the cells may be at slightly different levels or at slight angles to each other. Accordingly, we have provided the means shown in Fig. 2, for connecting poles of two adjacent cells. This means preferably comprises a connecting member in the form of a flat, slightly flexible strip 75 of copper, each end of the strip being provided with a slightly elongated opening or slot 76 for receiving one of the poles C or D. It will be obvious that the spacing of the two cells shown in Fig. 2 may vary considerably without necessitating any movement of the cells in applying the connecting strip 75 to the poles thereof as shown. The strip may be firmly secured to each pole between a pair of nuts.

It is to be understood that the specific construction illustrated and described herein is subject to many modifications and changes in the form, size and arrangement of parts without departing from the spirit of the invention and the scope of the appended claims.

Having now described our invention, what we claim as new therein and desire to protect by Letters Patent of the United States is as follows:—

1. A storage battery element or plate comprising a grid having a plurality of rows of substantially rectangular equal-sized openings therein whereby the grid is formed with a series of substantially parallel strips adjacent and between said rows, said strips being of progressively increasing current-carrying capacity from one side of the grid to the opposite side thereof, substantially as described.

2. A storage battery element or plate comprising a grid having a plurality of rows of substantially rectangular openings therein whereby the grid is formed with a series of substantially parallel strips adjacent and between said rows, said strips being of progressively increasing width from one side of the grid to the opposite side thereof, and each of said strips being of substantially equal width throughout its length, substantially as described.

3. A storage battery element or plate comprising a main grid having a plurality of substantially rectangular openings therein, and a plurality of sub-grids carrying active material respectively secured to said main grid over said opening, the adjacent sub-grids having interfitting edge portions, substantially as described.

4. A storage battery element or plate comprising a main grid having a plurality of substantially rectangular openings therein, and a plurality of sub-grids having serrated edge portions and carrying active material, said sub-grids being disposed over said openings with the adjacent edge portions thereof interfitting, the teeth or serrations of the sub-grids being secured to said main grid, substantially as described.

5. A storage battery element comprising a plate carrying active material and provided with serrated edge portions, substantially as described.

6. In combination, a storage battery element or plate, and one or more strips carried thereby for insulating the plate, when assembled in a battery cell, from an adjacent element or plate, said strips being affixed at one end to said first mentioned plate and having pin and slot connection therewith at the other end, substantially as described.

7. In a storage battery cell, the combination of a container, and a group of alternately arranged positive and negative plates therein, each of said plates carrying pockets containing active material, the pockets of the positive plates being substantially at right angles to the pockets of the negative plates, substantially as described.

8. In a storage battery cell, the combination of a container, a positive and a negative plate therein each carrying pockets containing active material, the pockets of the positive plate being substantially at right angles to the pockets of the negative plate, means contacting with and extending transversely of the pockets of one of the plates, and means extending transversely of the pockets of the other plate and disposed between the latter pockets and said first means for insulating and separating the plates from each other, substantially as described.

9. In a storage battery cell, the combination of a pair of plates carrying pockets containing active material, the pockets of one plate being substantially at right angles to the pockets of the other plate, and one or more insulating strips situated between said plates and extending transversely of the pockets of one of the plates, substantially as described.

10. In a storage battery cell, the combination of a pair of plates carrying pockets containing active material, the pockets of one plate being substantially at right angles to the pockets of the other plate, one or more insulating strips situated between said plates and extending transversely of the pockets of one of the plates, and one or more strips located between said insulating strips and the pockets of the other plate and extending transversely of the latter pockets, substantially as described.

11. In a storage battery cell, the combination of a pair of plates carrying pockets containing active material, the pockets of one plate being substantially at right angles to the pockets of the other plate, one or more insulating strips situated between said plates and extending transversely of the pockets of one plate, and one or more strips located between said insulating strips and the pockets of the other plate and extending transversely of the latter pockets, said insulating strips being supported by one of the plates and connected therewith to permit relative expansion and contraction of such plate and strips, substantially as described.

12. In a storage battery, a plurality of positive and negative elements or plates, a pair of rods on which the positive and negative plates are respectively mounted, a plurality of spacing members on each of said rods respectively disposed between pairs of adjacent plates mounted on the latter, and an insulating member secured to and projecting beyond each end of each of said rods, substantially as described.

13. In a storage battery, a plurality of positive and negative elements or plates, a pair of rods on which the positive and negative tive plates are respectively mounted, a plurality of metallic spacing members on each of said rods respectively disposed between pairs of adjacent plates mounted on the latter, metallic members detachably secured to the ends of each rod beyond the outside plates mounted on the latter, and insulating members detachably secured to said last named metallic members and projecting beyond the ends of the respective rods, substantially as described.

14. A storage battery cell having a set of positive and a set of negative elements or plates and a plurality of poles or terminals for each such set of plates, each set being so connected to the poles therefor that it is, in effect, divided into a plurality of groups of plates, one group for each pole, substantially as described.

15. A storage battery cell having a set of positive and a set of negative elements or plates and a plurality of poles or terminals for each such set of plates, each set being so connected to the poles therefor that it is, in effect, divided into a plurality of groups of plates, one group for each pole, the plates of said groups being symmetrically disposed with reference to the respective poles, substantially as described.

16. A storage battery cell having a set of positive and a set of negative elements or plates, a plurality of poles or terminals for each such set of plates, and means for rigidly and electrically connecting the plates of each set together and to the poles therefor, each set being so connected to the poles therefor that it is, in effect, divided into a plurality of groups of plates, one group for each pole, substantially as described.

17. A storage battery cell having a set of positive and a set of negative elements or plates, a plurality of poles or terminals for each such set of plates, and means for rigidly and electrically connecting the plates of each set together and to the poles therefor, each set being so connected to the poles therefor that it is, in effect, divided into a plurality of groups of plates, one group for each pole, the plates of said groups being symmetrically disposed with reference to the respective poles, substantially as described.

This specification signed and witnessed this 22nd day of May, 1914.

MILLER REESE HUTCHISON.
CHARLES W. NORTON.

Witnesses:
WILLIAM A. HARDY,
MARY J. LAIDLAW.